United States Patent [19]

Allcock et al.

[11] 3,937,790

[45] Feb. 10, 1976

[54] USE OF WATER AS A CATALYST FOR THE POLYMERIZATION OF CHLOROCYCLOPHOSPHAZENES

[75] Inventors: Harry Rex Allcock, Karen M. Smeltz, both of State College, Pa.; James Earl Gardner, deceased, late of State College, Pa., by Patricia Gardner, executrix, State College, Pa.

[73] Assignee: The Firestone Tire & Rubber Company, Akron, Ohio

[22] Filed: Oct. 2, 1974

[21] Appl. No.: 511,400

[52] U.S. Cl. .............................................. 423/300
[51] Int. Cl.² ......................................... C01B 25/00
[58] Field of Search ................................... 423/300

[56] References Cited
UNITED STATES PATENTS

| | | | |
|---|---|---|---|
| 3,179,489 | 4/1965 | Beckt................................. | 423/300 |
| 3,370,020 | 2/1968 | Allcock et al. ................. | 423/300 X |

Primary Examiner—Oscar R. Vertiz
Assistant Examiner—Gregroy A. Heller

[57] ABSTRACT

The polymerization of hexachlorocyclotriphosphazene to poly(dichlorophosphazene) at elevated temperatures is a highly unpredictable process. The rate of polymerization varies over a wide range and is dependent on the history of the trimer and on the method of handling prior to polymerization.

It appears that small amounts of water may possibly function as catalytic species for the polymerization. The addition of controlled amounts of water to the system results in a marked increase in reaction rate, and the rigorous exclusion of water from the system inhibits the reaction. The results favor the view that complete exclusion of water from the system may result in a system that cannot be polymerized. Thus, water appears to be a key component for polymerization.

5 Claims, 1 Drawing Figure

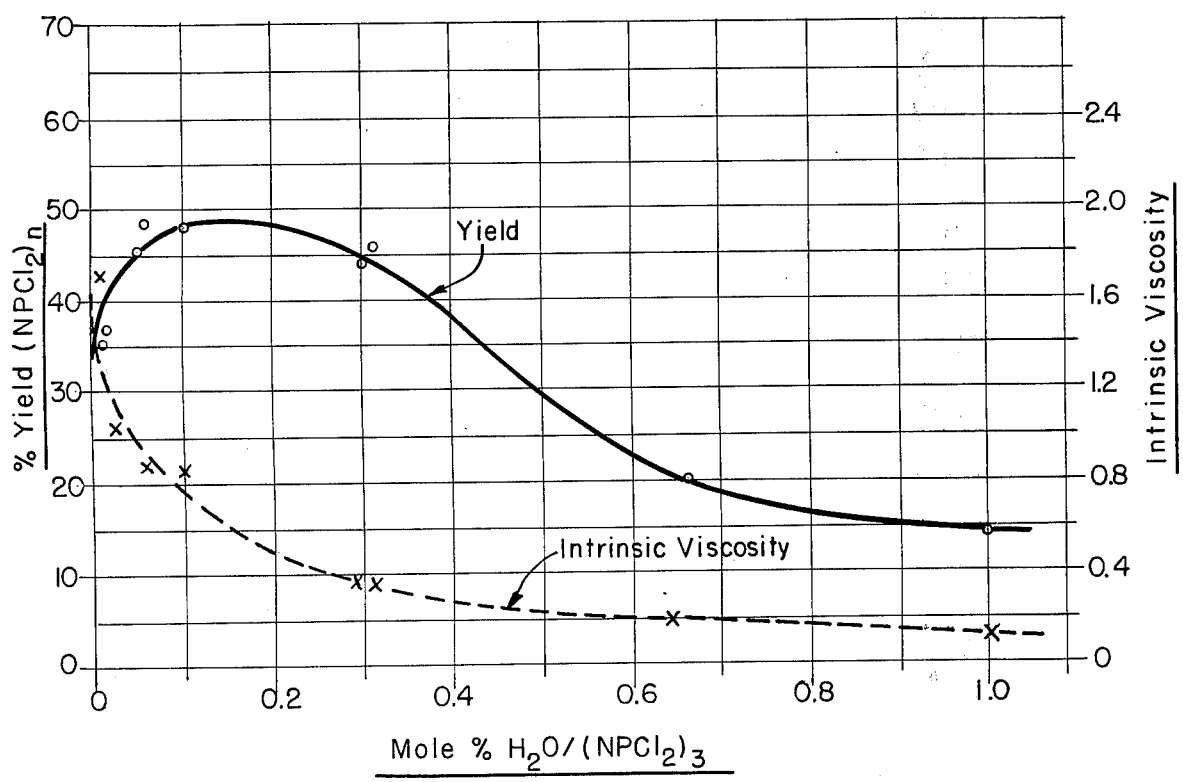

USE OF WATER AS A CATALYST FOR THE POLYMERIZATION OF CHLOROCYCLOPHOSPHAZENES

The thermal polymerization of $(PNCl_2)3,4$ to $(NPCl_2)_n$ is known and is described in U.S. Pat. No. 3,370,020 issued Feb. 20, 1969 to Allcock and Kugel and is described in a recently published text by H. R. Allcock entitled "Phosphorus-Nitrogen Compounds" published by Academic Press, New York, New York (1972), in the March 1974 issue of Scientific American and elsewhere in the literature.

As described in the above noted patent, thermal polymerization of $(NPCl_2)_m$ wherein $m$ is 3, or 4, is effected by heating the cyclochlorophosphazenes at temperatures between about 200°C and about 300°C for between 30 minutes and 48 hours. The starting materials, as described in the patent "must be substantially pure, i.e., they must contain not more than about 1% impurity such as water, for example".

The polymerization of hexachlorocyclotriphosphazene to poly(dichlorophosphazene) at elevated temperatures is a highly unpredictable process. The rate of polymerization varies over a wide range and is dependent on the history of the trimer and on the method of handling prior to polymerization.

It appears from this behavior that small amounts of water may possibly function as catalytic species for the polymerization. The addition of controlled amounts of water to the system results in a marked increase in reaction rate, and the rigorous exclusion of water from the system inhibits the reaction. The results favor the view that complete exclusion of water from the system may result in a system that cannot be polymerized. Thus, water appears to be a key component for polymerization.

With water present in the hexachlorocyclotriphosphazene in the range 0.005–0.10 mol % wherein mol % equals moles $H_2O$ [moles $H_2O$ + moles $(NPCl_2)_3$]×100, the resulting polydichlorophosphazene was found to be substantially linear and the resulting high polymer is found to be soluble in benzene or tetrahydrofuran. Such polymer is suitable for conversion to derivatives as described in U.S. Pat. No. 3,515,688 issued June 2, 1970 and is clearly distinguishable from insoluble polymeric $(NPCl_2)_n$ which does not dissolve in benzene and which is not suitable for formation of such derivatives because it is crosslinked.

It has been found that at very low water concentrations, e.g., within the ranges from about 0.005 mol % and 0.10 mol % and preferably from about 0.02 mol % to about 0.05 mol % water in $(NPCl_2)_3$, polymers with a desired intrinsic viscosity for elastomers are obtained at relatively acceptable yields.

When more than about 0.2 mol % of water is present, the product of the polymerization process is found to have too low a molecular weight for elastomer applications.

At higher concentrations of water the yield of polymer in a given time decreased with increasing amounts of water and crosslinked polymer was formed.

In the single sheet of drawings forming a part of this application, the FIGURE is a graphical representation of results obtained by heating a sample of purified hexachlorocyclotriphosphazene at a temperature of 250°C for 21 hours, in the presence of various amounts of water up to 1 mol %.

In the $(NPCl_2)_n$ products of this invention $n$ is from about 16 to about 20,000.

It was also found that increasing amounts of water results in a decrease in the intrinsic viscosity of the polymer formed.

In order to produce the linear

from crude hexachlorocyclotriphosphazene represented by the formula

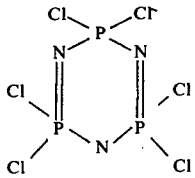

hexachlorocyclotriphosphazene obtained from a commercial source was purified by sublimation at 50°C/0.7 mm; the sublimate was twice recrystalized from dry hexane, then dried in vacuum for 15 hours, then resublimed. A weighed amount of the purified material was collected in a polymerization tube and a measured amount of water vapor was introduced into the vacuum line connected to the trimer-containing polymerization tube. The tube was then sealed and heated to 250°C in a temperature controlled oven in order to polymerize the hexachlorocyclotriphosphazene. The polymerizates were characterized by reacting them with sodium trifluoroethoxide, e.g., as described in U.S. Pat. No. 3,370,020 to form poly(bistrifluoroethoxy)phosphazene. The derivatized polymers were then characterized by gel permeation chromatography.

The results obtained over the range 0% to 1.0 mol % water are shown in the FIGURE.

The invention is applicable to the polymerization of octachlorocyclotetraphosphazene and to other similar halophosphazenes in which Br is present instead of Cl.

Having described a preferred embodiment of the invention it is not intended that it be limited except as may be required by the appended claims.

We claim:

1. In the polymerization of chlorocyclophosphazenes to produce a substantially linear $(NPCl_2)_n$ polymer product in which n is from about 16 to about 20,000, wherein hexachlorocyclotriphosphazene, octachlorocyclotetraphosphazene or mixtures of said hexa- and octachlorocyclophosphazenes are polymerized at temperatures between 200° and 300°C, the improvement which comprises conducting the polymerization in the presence of between 0.005 and 1.0 mol % of $H_2O$.

2. The process of claim 1 wherein the water initially present is between about 0.02 and 0.10 mol %.

3. The process of claim 1 wherein the amount of water is between 0.035 and 0.05 mol %.

4. The process of claim 1 wherein the amount of water is between 0.1 and 1.0 mol %.

5. The process of claim 1 wherein the starting material is hexachlorocyclotriphosphazene.

* * * * *